United States Patent [19]

Howard

[11] 4,045,074
[45] Aug. 30, 1977

[54] AIRSTREAM DEFLECTOR FOR TRAILER-TOW VEHICLE COMBINATIONS

[75] Inventor: George W. Howard, Northbrook, Ill.

[73] Assignee: Leisure Manufacturing Co., Inc., Des Plaines, Ill.

[21] Appl. No.: 677,239

[22] Filed: Apr. 15, 1976

[51] Int. Cl.$^2$ .......................... B60J 9/04; B62D 35/00
[52] U.S. Cl. ......................................... 296/1 S; 296/91
[58] Field of Search ................... 296/15, 91, 97 K; 403/65, 119; 248/165, 167

[56] References Cited

U.S. PATENT DOCUMENTS

| 2,544,615 | 3/1951 | Raymond | 248/167 X |
|---|---|---|---|
| 3,596,974 | 8/1971 | Adams | 296/1 S |
| 3,947,065 | 3/1976 | Geiger | 296/1 S |

Primary Examiner—Philip Goodman
Attorney, Agent, or Firm—Silverman & Cass, Ltd.

[57] ABSTRACT

A collapsible airstream deflector is secured to the roof of a towing vehicle to deflect air over a towed vehicle when the vehicles are in motion to reduce the air resistance or drag and fuel consumption of the vehicles. The airstream deflector has pivotal arms secured to the rear surface of a sheetlike airstream deflecting member. The arms respectively are swung to planes, each of which is generally perpendicular to the plane of the deflecting member, the arms being locked in place by means of a single removable locking bar applied to the ends of the arms before the deflector is secured to the roof. When the deflector is removed from the vehicle roof, the locking bar is removed; then the arms are swung against the rear surface of the deflecting member so that the deflector can be easily stored. Notwithstanding the fact that the arms are easily pivotable, the deflector is self-stabilizing when the arms are locked in their operative positions by the removable locking bar. This enables the airstream deflector to withstand the substantial wind forces created by vehicle motion.

15 Claims, 5 Drawing Figures

AIRSTREAM DEFLECTOR FOR TRAILER-TOW VEHICLE COMBINATIONS

BACKGROUND OF THE INVENTION

The invention relates to an airstream deflector for a towing vehicle and more particularly to a collapsible airstream deflector which is easily mounted onto or removed from a vehicle.

Current interest in camping and recreational vehicles has brought about a need for more efficient towing combinations. Airstream deflectors of various types have been developed previously to solve this need by reducing drag and increasing fuel economy; however, they have several disadvantages.

The need has developed for a strong, rugged airstream deflector which is also easily collapsible. The feature of collapsiblity provides several advantages; however, collapsibility as a general rule is equated to weakness in construction. The shipping and storing of collapsed or knocked down deflectors by manufacturers, distributors and users conserves space and decreases the costs to all concerned. The user can more readily utilize the towing vehicle without the airstream deflector, since the user is able to remove and collapse the deflector quickly and easily. The collapsed deflector may then be stored in a small space or transported inside the vehicle itself.

SUMMARY OF THE INVENTION

The above and other disadvantages of prior art airstream deflector devices and techniques are overcome in accordance with the present invention by providing a lightweight self-stabilizing airstream deflector device which is readily collapsible for storage. The deflector comprises a generally planar, rigid sheetlike airstream deflecting member with stabilizing arms pivotally secured to the rear surface of the deflecting member. The stabilizing arms may be pivoted against the rear surface of the deflecting member to form a small package for storage, and yet they may respectively easily be pivoted to planes generally perpendicular to the rear surface and locked in place with a removable locking bar to provide a self-stabilizing airstream deflector to be mounted on a towing vehicle. Flexible connectors are provided to connect the deflector device to the roof of the towing vehicle.

DESCRIPTION OF THE PREFERRED EMBODIMENT

As indicated above, the invention is concerned with a deflector for deflecting air over a towed vehicle to reduce drag and decrease fuel consumption, which deflector is capable of being easily removed and stored. Notwithstanding that the deflector is lightweight and easily collapsible, the arrangement is self-stabilizing when locked in an operative position and mounted on the roof of the towing vehicle. This enables the structure to withstand the great forces directed against the face of the deflector when the vehicle is in motion.

Figure 1:
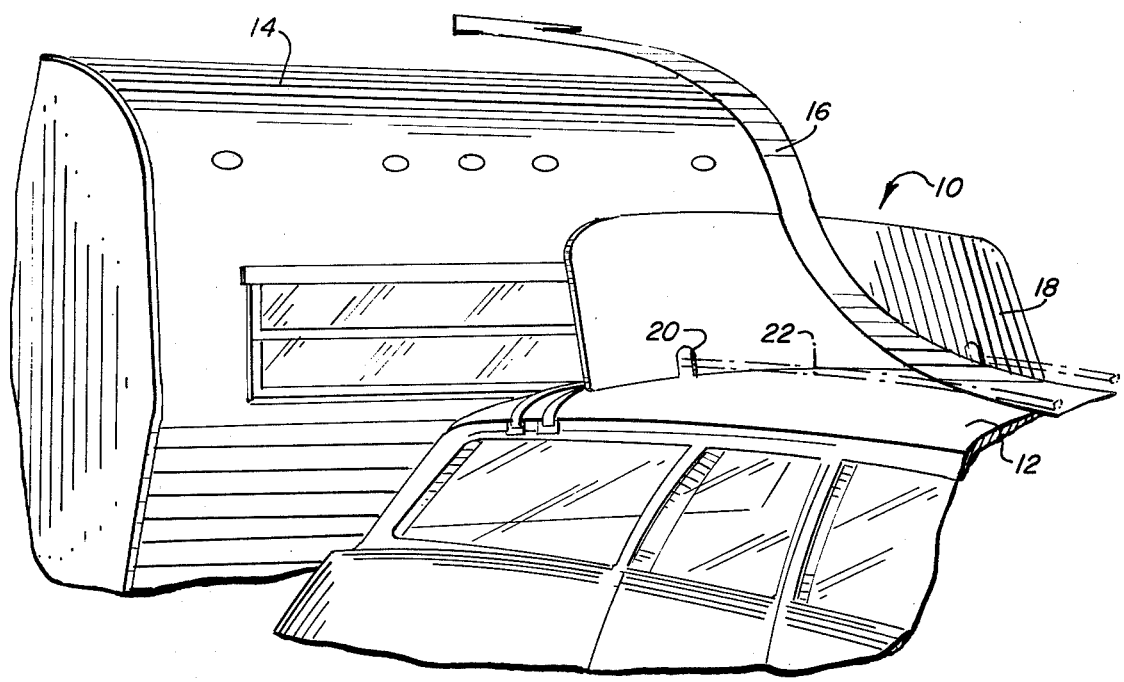
FIG. 1 is a perspective view of the airstream deflector mounted on a trailer-tow vehicle combination which is partially illustrated.

Referring now to FIG. 1, the airstream deflector of the invention is designated generally at 10 mounted on the roof of a towing vehicle 12. A towed vehicle 14 is shown coupled to the towing vehicle 12. The forward motion of the towing vehicle results in a stream of displaced air 16 being deflected by the deflector 10 and passing over the top of the towed vehicle 14.

The deflection of the stream of air 16 over the towed vehicle 14, according to accepted and well-known principles, reduces the drag of the towed vehicle 14 and improves the fuel consumption or mileage of the towing vehicle 12. The airstream deflector is also believed to reduce the buffeting of the towed vehicle 14 by head winds or the turbulence produced by passing vehicles and reduces stains on the front of the towed vehicle caused by impacting insects. The reduced drag and increased stability of the towed vehicle 14 has a corresponding benefit on the towing vehicle 12, including less load on the cooling system and less strain on the drive parts of the towing vehicle 12.

The airfoil portion of the airstream deflector 10 comprises a contoured sheetlike member 18 which provides for the deflection of the airstream 16. The contoured member 18 may be made from heavy gauge aircraft aluminum to provide a sturdy, lightweight device. This may be done by stamping, forming or other well-known fabricating techniques.

The sheetlike member 18 preferably is formed with a forward bowed shape to add strength and rigidity to the operative deflector. The bowed or curved shape deflects a portion of the stream of air 16 to the sides of the deflector and around the towed vehicle 14.

A notch 20 may be cut in the botton edge of the member 18 to accommodate a luggage rack 22 or other obstruction mounted on the top of the towing vehicle 12, thereby enabling the deflector 10 to be mounted at the optimum effective distance from the roof of the vehicle 12.

Figure 2:
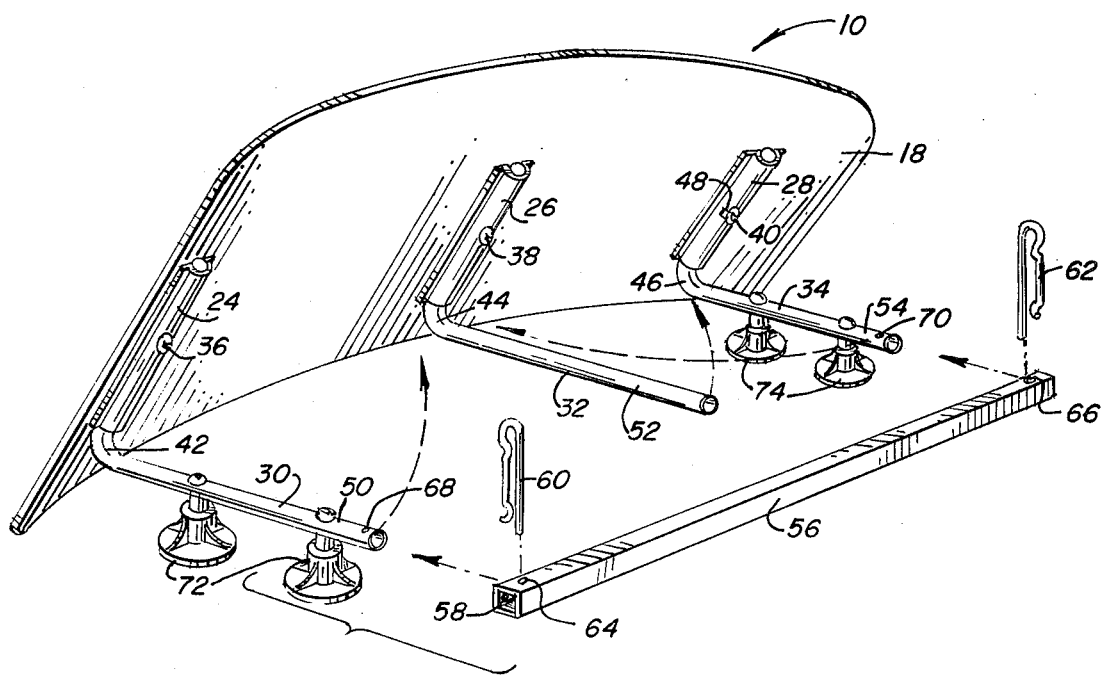
FIG. 2 is a rear perspective view of the deflector partially disassembled.

The rear surface of the member 18 and the support structure of the device are best illustrated in FIG. 2. First, second and third pivot brackets of sleeves 24, 26 and 28 are secured to the rear surface of the contoured member 18. The brackets or sleeves 24, 26 and 28 are engaged flat against the rear surface and are spaced apart parallel to one another. When the deflector 10 is in the operative position, these brackets or sleeves will be disposed generally vertically with respect to the top of the vehicle 12. The brackets or sleeves may be permanently secured to the surface 18 by any convenient means such as spot welding.

First, second and third stabilizing member 30, 32 and 34 are telescopically engaged and hence pivotally mounted in the respective pivot brackets or sleeves 24, 26 and 28. The stabilizing members are mounted in the brackets by pins 36, 38 and 40. The pins are respectively mounted in first arms 42, 44 and 46 of the respective stabilizing members 30, 32 and 34. The pins retain the first arms in the pivot brackets or sleeves, while allowing the first arms to be pivoted about their axis, by engaging the arms through a transverse slot in each bracket. Only one of the transverse slots 48 is illustrated, in the third pivot bracket 28.

The pivotal mounting allows the second arms 50, 52 and 54 of the respective stabilizing member 30, 32 and 34, to easily be swung against the rear surface as indicated by the dashed arrows. The first and second arms of each of the stabilizing members preferably are formed at an angle integral with one another. In a first or operative position the second arms are each positioned substantially perpendicular to the rear surface of the contoured member 18 and a removable locking bar 56 is inserted over the ends of the second arms 50, 52 and 54. The removable locking bar 56 preferably is a hollow rectangular bar having holes only through one side to receive the ends of the second arms. Only one hole 58 is illustrated in FIG. 2.

In the operative position, the ends of the second arms are inserted through the holes into the removable locking bar 56. Spring retaining clips 60 and 62 then are inserted through holes 64 and 66, respectively, in the removable locking bar (each of which would have a matching hole in the bottom of the locking bar which is not shown). The spring clips 60 and 62 also are inserted through holes 68 and 70 in the second arms 50 and 54 (each of which also has a matching hole in the bottom of the arm which also is not shown).

The middle second arm 52 is retained without a spring clip in the locking bar 56, of course, such a clip may also be provided for this arm. The spring clips 60 and 62 are illustrative of retaining devices; however, these may be any of numerous types of securing springs, clips or pins.

Each of the outer second arms 50 and 54 has a pair of rubber suction mounts 72 and 74, respectively, to support the airstream deflector on top of the towing vehicle roof. The type of suction mount is not critical and may be any type of mount, preferably having a nonabrasive mounting surface.

Figure 3:
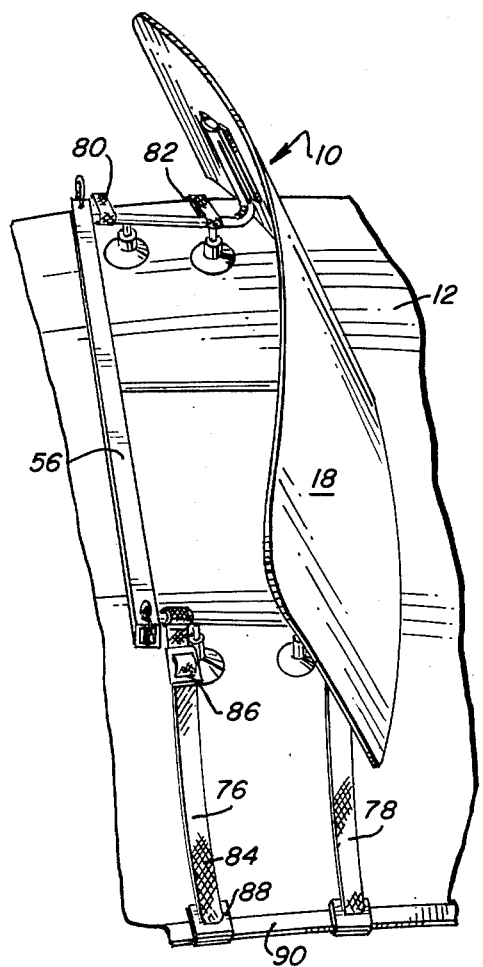
FIG. 3 is a more detailed top perspective view of the deflector mounted on a towing vehicle roof which is partially illustrated.

Once the locking bar 56 has been secured to the second arms of the stabilizing members in the operative position, the deflector 10 can be mounted on the towing vehicle 12 as illustrated in FIG. 3. Four flexible tie-down straps 76, 78, 80 and 82 are utilized to secure the deflector 10 to the vehicle roof. Each of the flexible tie-down straps is identical in construction, so only the first strap 76 will be discussed in detail. The flexible strap 76 has a flexible belt portion 84, which may be made out of a material such as nylon webbing, which is light but very strong. The strap also has an adjustable buckle 86 and a side or gutter clamp 88.

The airstream deflector 10 is positioned on top of the vehicle 12 and the side clamps 88 are positioned transversely over an edge 90 or gutter of the vehicle roof. The flexible tie-down straps 76, 78, 80 and 82 are then tightened utilizing the adjustable buckles 86. The deflector is then ready to deflect the airstream over the towed vehicle when the towing vehicle in put in forward motion.

The deflector 10 can be easily removed and collapsed, whenever desired, by reversing the operation. The collapsible deflector 10 is quickly disassembled by unfastening the buckles 86, to release the tension on the straps, and removing the side clamps 88. The deflector 10 can then be lifted from the vehicle roof 12. Referring again to FIG. 2, the spring clips 60 and 62 are then snapped loose and the locking bar 56 is removed from the ends of the second arms. The second arms 50, 52 and 54 can then be swung, in the direction of the dashed arrows, against the rear surface of the contoured member 18. The deflector 10 is then collapsed and readily may be stored in a small space.

Figure 4:
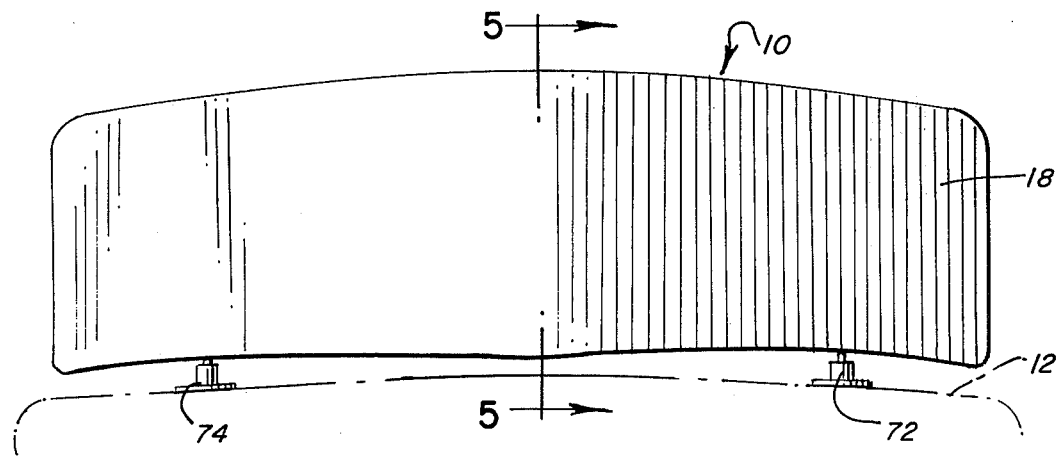
FIG. 4 is a front view of the deflector mounted on a towing vehicle.

FIG. 4 shows a front view of the collapsible airstream deflector 10 mounted on the towing vehicle 12. The substantial area presented to the forces of the airstream from the movement of the towing vehicle can be clearly seen. It can thus be appreciated that the collapsible deflector 10 is self-stabilizing and very sturdy, notwithstanding the fact that the second arms are easily pivotable so the device may be collapsed.

Figure 5:
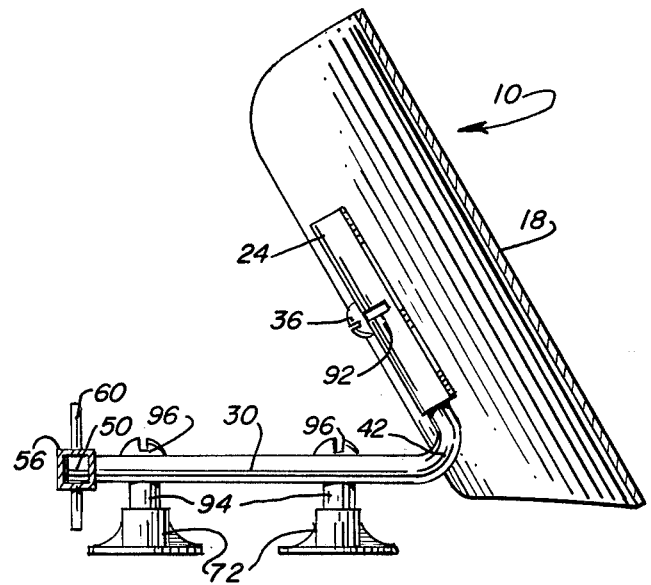
FIG. 5 is a sectional side view of the deflector taken along line 5—5 of FIG. 4.

Referring now to FIG. 5, the angle presented by the contoured member 18, when the deflector is in the operative position, is best illustrated. The spring retainingg clip 60 is inserted completely through the removable locking bar 56 and the end of the second arm 50 of the first stabilizing member 30 to secure the stabilizing member in the operative position. A second transverse slot 92 (see transverse slot 48 of FIG. 2) is also illustrated, which allows the stabilizing member 30 to be pivoted in the bracket or sleeve 24, while being retained in the bracket by the first pin 36 mounted through the slot into the first arm 42.

The suction mounts 72 are mounted on a pair of legs 94 enabling the deflector 10 to be secured at the optimum effective distance above the towing vehicle roof. The legs 94 can be secured to the first stabilizing member 30 by any convenient method, such as screws 96. The third stabilizing member 34 has an identical pair of legs (see FIG. 2).

The stabilizing members 30, 32 and 34 and the locking bar 56 preferably are hollow metal members to provide strength without adding weight to the deflector device 10. They may, of course, be solid or of other configurations within the scope of the invention.

Modifications and variations of the present invention are possible in light of the above teachings. It is, therefore, to be understood that within the scope of the appended claims, the invention may be practiced otherwise than as specifically described.

What is claimed and desired to be secured by Letters Patent of the United States is:

1. A collapsible airstream deflector device adapted to be mounted on the roof of a towing vehicle to deflect air over a towed vehicle when said vehicles are in motion, comprising:
   A. a generally planar, rigid, rectangular deflecting member of sheetlike material adapted to be mounted transversely of the towing vehicle roof;
   B. support means for enabling the deflecting member to be secured to said roof, said support means comprising:
      1. a pair of stabilizing members, each stabilizing member having first and second arms rigidly connected to one another at an angle relative to one another;
      the first arms being arranged generally parallel to one another and each being pivotally connected on an axis substantially parallel to the rear surface of said deflecting member at locations adjacent opposite ends of the member, and able to rotate on said axis parallel to the deflecting member when disassociated from the towing vehicle to enable each second arm to be swung between a first operative position where said first and second arms define a plane generally perpendicular to that of the deflecting member and a second position in which each second arm overlies the rear surface close thereto;

C. locking means for removably locking said deflecting member and support means with the stabilizing members in said first operative position; and D. means for connecting the deflector device to the towing vehicle.

2. A collapsible airstream deflector device as claimed in claim 1 further including:
gripping means secured to said second arms to enable connection thereof to said towing vehicle roof.

3. A collapsible airstream deflector device as claimed in claim 1 wherein:
said deflecting member is of a forward curved shape.

4. A collapsible airstream deflector device as claimed in claim 1 wherein said means for connecting include:
flexible connection means for connecting each of said second arms to opposite sides of said towing vehicle.

5. A collapsible airstream deflector device as claimed in claim 1 wherein:
each of said first arms is of a cylindrical shape and is pivotally secured in a sleevelike pivot bracket connected to the rear surface of said deflecting member.

6. A collapsible airstream deflector as claimed in claim 1 wherein said locking means include:
a longitudinal bar detachably secured on opposite ends thereof to said second arms.

7. A collapsible air stream deflector device as claimed in claim 6 wherein:
said bar is adapted to receive the end of each second arm in each end thereof; and including
pin means for locking at least one of said second arms in said bar.

8. A collapsible airstream deflector device as claimed in claim 1 wherein said support means further include:
a third stabilizing member, having first and second arms connected at an angle relative to one another;
the first arm being arranged generally parallel to the first arms of said first pair of stabilizing members and being pivotally connected to the rear surface of said deflecting member at a location intermediate said first pair of stabilizing members, and able to rotate on an axis parallel to the deflecting member to enable the second arm to be swung between a first operative position where said first and second arms define a plane generally perpendicular to that of the deflecting member and a second position in which the second arm overlies the rear surface close thereto; and
said locking means also removably locking said deflecting member and support means with the third stabilizing member in said first operative position.

9. A collapsible airstream deflector device as claimed in claim 8 wherein:
said first and second arms of said stabilizing members are integrally formed.

10. A collapsible airstream deflector device as claimed in claim 8 wherein said locking means include:
a longitudinal bar detachably secured to said second arms.

11. A collapsible airstream deflector device as claimed in claim 10 wherein:
said bar is adapted to receive the end of each second arm in the first operative position; and including
pin means for locking at least one of said second arms in said bar.

12. In combination, a vehicle having a rooftop and an airstrem deflector mounted of said rooftop, transversely of said rooftop and towards the rear of said vehicle, said deflector comprising:

A. a generally plannar, rigid, rectangular deflecting member of sheetlike material mounted at an angle to said rooftop;

B. support means supporting the deflecting member including:
1. three stabilizing members, each stabilizing member having first and second arms rigidly connected to one another at an angle relative to one another;
2. the first arms being arranged generally parallel to one another, two arms being pivotally connected on an axis substantially parallel to the rear surface of said deflecting member at locations adjacent opposite ends of the member and the third arm at a location intermediate said end two arms, and able to rotate on said axis parallel to the deflecting member when disassociated from the towing vehicle to enable each second arm to be swung between a first operative position where said first and second arms define a plane generally perpendicular to that of the deflecting member and a second position in which each second arm overlies the rear surface close thereto;

c. locking means removably locking said deflecting member and support means with the stabilizing members in said first operative position; and D. means connecting the deflector device to the towing vehicle.

13. A collapsible airstream deflector device as claimed in claim 12 wherein said connecting means include:
flexible connection means connecting each of said end two second arms to opposite sides of said towing vehicle.

14. A collapsible airstream deflector device as claimed in claim 12 wherein:
said first and second arms of said stabilizing members are integrally formed.

15. A collapsible airstream deflector device as claimed in claim 12 wherein said locking means include:
a longitudinal bar receiving the end of each second arm in the first operative position; and including
pin means locking at least one of said second arms in said bar.

* * * * *